United States Patent [19]

Spitz

[11] Patent Number: 5,633,488

[45] Date of Patent: May 27, 1997

[54] METHOD AND APPARATUS TO ENABLE THE HIGH SPEED EVALUATION OF BAR CODE INDICIA

[75] Inventor: Glenn S. Spitz, Northport, N.Y.

[73] Assignee: Webscan, Inc., Northport, N.Y.

[21] Appl. No.: 575,097

[22] Filed: Dec. 19, 1995

[51] Int. Cl.$^6$ ..................................................... G06K 7/10
[52] U.S. Cl. ............................................. 235/462; 235/463
[58] Field of Search ...................................... 235/462, 463

[56] References Cited

U.S. PATENT DOCUMENTS

| | | | |
|---|---|---|---|
| 4,219,152 | 8/1980 | Couch et al. | 235/463 |
| 4,251,798 | 2/1981 | Swartz et al. | 235/462 |
| 4,360,798 | 11/1982 | Swartz et al. | 235/463 |
| 4,517,455 | 5/1985 | Benitez, III et al. | 235/463 |
| 4,705,939 | 11/1987 | Ulinski, Sr. | 235/466 |
| 4,740,675 | 4/1988 | Brosnan et al. | 235/462 |
| 4,980,544 | 12/1990 | Winter | 235/436 |
| 5,103,080 | 4/1992 | Barkan | 235/437 |
| 5,194,720 | 3/1993 | Reinnagel et al. | 235/437 |
| 5,218,190 | 6/1993 | Hardesty et al. | 235/462 |
| 5,231,293 | 7/1993 | Longacre | 250/568 |
| 5,285,056 | 2/1994 | Tedesco et al. | 235/472 |
| 5,294,783 | 3/1994 | Hammond, Jr. et al. | 235/462 |
| 5,298,728 | 3/1994 | Elliott et al. | 235/463 |
| 5,308,962 | 5/1994 | Havens et al. | 235/455 |
| 5,326,961 | 7/1994 | Sibata | 235/463 |
| 5,334,825 | 8/1994 | Maddox | 235/437 |
| 5,444,442 | 8/1995 | Sadakata et al. | 340/916 |
| 5,484,994 | 1/1996 | Roustaei | 235/462 |

FOREIGN PATENT DOCUMENTS 3-48754  3/1991  Japan.
4-96881  3/1992  Japan.

OTHER PUBLICATIONS

Uniform Code Council, "Quality Specification for the UPC Printed Symbol" Sep. 1994.
American National Stndards Institute (ANSI), "Bar Code Print Quality Guideline", ANSI X3. 182 —1990 [Not Submitted —Multiplicity of Above Item AO]. Mar. 1990.

*Primary Examiner*—Donald T. Hajec
*Assistant Examiner*—Michael G. Lee
*Attorney, Agent, or Firm*—FST Patent Associates

[57] ABSTRACT

A method and apparatus to enable the high speed evaluation of the quality of a bar code indicia by processing a scan reflectance profile signal generated by a scanner unit. The scan reflectance profile signal is sampled by an analog-to-digital converter, with the sample values from the converter processed as they are produced in real-time to determine a highest positive peak sample value and a lowest negative peak sample value for each element of the bar code indicia. The lowest negative and highest positive peak sample values for each element being accessible for post-processing to determine at least one figure of merit indicative of the quality of the bar code indicia being evaluated. The samples produced by the a/d converter are processed as they are generated to filter and reduce the total collection of sample values stored and/or considered, while still providing the critical highest and lowest peak sample values for the scanned elements to enable high speed verification.

20 Claims, 7 Drawing Sheets

METHOD AND APPARATUS TO ENABLE THE HIGH SPEED EVALUATION OF BAR CODE INDICIA

BACKGROUND OF THE INVENTION

1. Field of the Invention

The present invention relates to the evaluation of the quality of bar code indicia and, more particularly, to a method and apparatus to support high speed evaluation and verification of bar code indicia by processing scan reflectance profile signals in real-time.

2. Description of the Prior Art

At present bar code indicia are found in a wide range of applications and industries. Virtually every retail product marketed in supermarkets, retail stores, discount outlets, as well as many other establishments, utilize bar code symbols at their point-of-sale terminals, to monitor inventory levels, to generate orders for low inventory items, etc. Parcel post companies rely heavily on the use of bar code indicia to monitor the location and status of packages in transit. Further, bar code indicia are universally employed in most countries around the world.

A large number of varied printing techniques are employed to apply bar code indicia to packages and containers. In all cases there is a need to verify the quality of the resulting indicia. Considerations such as the decodability, symbol contrast, first read rate (FRR), substitution error rate (SER), and others, are of critical importance when evaluating the quality of bar code indicia.

Bar code verification systems are well known in the art. Typically, these systems produce an analog signal known as a scan reflectance profile signal, or simply the scan reflectance signal, which is representative of the elements comprising the bar code indicia. The scan reflectance signal is often sampled, by a device such as an analog-to-digital converter, to produce a collection of sample values representative of the entire scan reflectance profile signal that are stored in a memory unit. The entire collection of sample values is generally very large and must be completely processed to evaluate the quality of the bar code indicia. Systems utilizing this method, wherein the entire scan reflectance profile signal is sampled and the sample values stored in memory, require a large sample memory. In addition, these systems are processor intensive, essentially requiring the entire processing power of the system CPU during sample processing and analysis. As a result, systems of this type are generally not capable of supporting real-time high speed verification. And if they are, they are overly expensive.

An example of an application where a high speed real-time evaluation and verification system would be desired is a system employed during the automated filling of a container on a conveyor line, wherein a bar code indicia is printed on the container. In this case verification in real-time is desired to detect when problems arise in the bar code printing process—at which point the line may be stopped to correct the problem. Generally in situations where full 100% verification is required, very high cost verifiers are employed, or the speed of the conveyor or assembly line is reduced.

Other systems are known that begin to process data samples as they are being generated and loaded into memory structures such as a first-in-first-out (FIFO) memory. Although, these systems decrease the time required for evaluation and verification of bar code indicia by overlapping in time the steps of generating sample values and processing sample values, they still require relatively large amounts of sample memory and consume most available CPU processing power. Again, due to the large number of sample values that must be processed and analyzed, they too are generally not capable of high speed real-time verification.

At present, several standard guidelines have been established to quantitatively evaluate the quality of bar code indicia. Two such guidelines have been defined by the American National Standards Institute (ANSI), and the Uniform Code Council (UCC). The ANSI guideline (ANSI X3.182-1990) is titled "Bar Code Print Quality Guideline". The UCC guideline is titled "Quality Specification for the UPC Printed Symbol" (September 1994). The ANSI and UCC documents are hereby incorporated by reference. In particular, the ANSI document provides in section 4 measurement methodologies and related information, while parts 2 and 3 of the UCC document provide definitions and related measurement subject matter. These two documents define a number of figures of merit which can be determined from the sampled scan reflectance profile signal. However, since each guideline defines an entire procedure for evaluation, and further requires a succession of scans taken at equally spaced locations within an "interrogation window" along the height of the elements comprising the bar code indicia, they have placed further demands on systems which are utilized to evaluate and verify the printed and general quality of bar code indicia. It is no longer the case where a few simple checks, such as decodability and scan contrast may be employed to determine the quality of indicia.

With the advent of rigorous and well defined quantitative measures to evaluate bar code indicia, such as the common UPC bar code symbol, there is a need for improved methods and associated apparatus to support evaluation and verification, particularly in real-time where 100% verification is desired. Objects of the present invention are, therefore, to provide new and improved methods and apparatus to support evaluation and verification of bar code indicia having one or more of the following capabilities, features, and/or characteristics:

- enable high speed evaluation and verification;
- detection and quantification of indicia defects;
- relatively low cost implementation using components and devices readily available;
- enable high speed verification as bar code indicia are being printed;
- support 100% real-time verification in demanding applications;
- process sample data as it is generated in order to store in memory only the critical samples that are necessary for quantitative evaluation;
- reduce the amount of sample memory and processing overhead required.

SUMMARY OF THE INVENTION

In accordance with the invention, a method and apparatus are disclosed to enable high speed evaluation and verification of bar code indicia.

The method for evaluating and verifying the quality of a bar code indicia is provided by processing a scan reflectance profile signal representative of the elements of the indicia. The scan reflectance profile signal is generated by scanning the indicia. The method includes the step of sampling the scan reflectance signal to provide a sequence of sample values representative of each element comprising the bar code indicia, and further provides for the processing the sequence of sample values as they are produced to determine a highest positive peak sample value and a lowest negative peak sample value associated with each element comprising the bar code indicia. The plurality of pairs of peak sample values, wherein each pair of values consists of the highest positive and lowest negative peak sample values for each element, are accessible for post-processing to determine at least one figure of merit indicative of the quality of the bar code indicia.

The apparatus for evaluating and verifying the quality of a bar code indicia processes a scan reflectance profile signal generated by a scanner unit and representative of the elements comprising the bar code indicia. The apparatus includes an analog-to-digital converter to produce a sequence of samples wherein each sample value is representative of the analog value of the scan reflectance signal. An edge detection unit is included to detect edges present in the scan reflectance profile signal, the edges indicative of the start of elements comprising the bar code indicia being evaluated. A peak sample determining unit is employed to determine a highest positive peak sample value and a lowest negative peak sample value produced by the analog-to-digital converter for each element of the indicia. The highest positive and lowest negative peak sample values associated with already processed elements are accessible to begin post-processing to determine at least one figure of merit indicative of the quality of the bar code indicia.

For a better understanding of the invention, together with other and further objects, reference is made to the accompanying drawings and the related detailed description, with the scope of the invention pointed out in the appended claims.

BRIEF DESCRIPTION OF THE DRAWINGS

In the drawings, like elements are assigned like reference numerals. The drawings are briefly described as follows.

DETAILED DESCRIPTION OF THE INVENTION

Figure 1A:
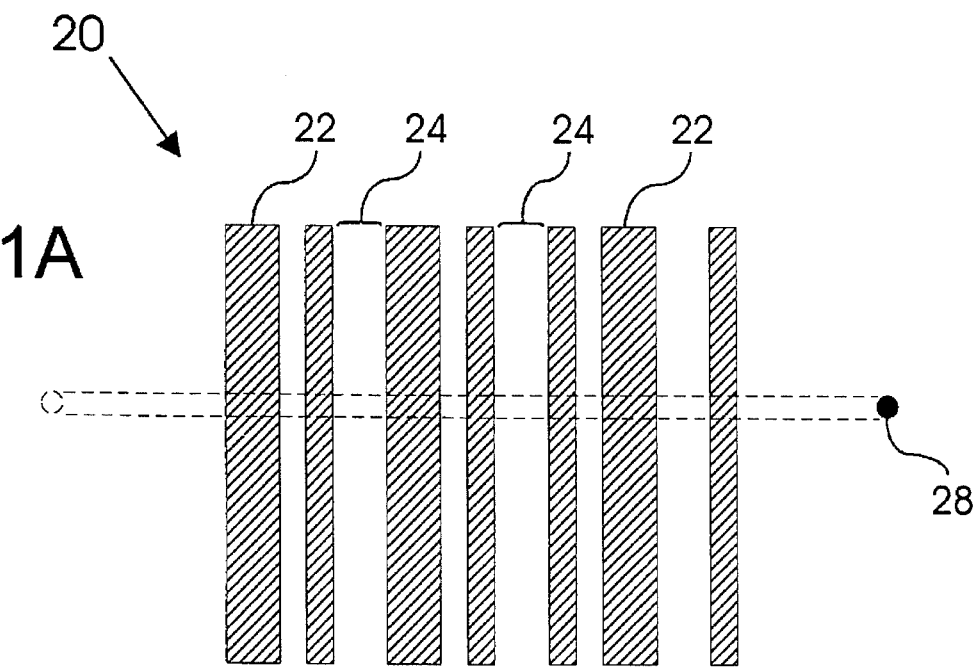
FIGS. 1A and 1B illustrate, respectively, an ideal bar code indicia and a corresponding ideal scan reflectance profile signal.

Referring now to FIG. 1A, there is illustrated an ideal bar code indicia 20 comprised of a number of bars 22, and spaces 24 disposed therebetween. Together, the bars 22 and the spaces 24 comprise the elements of the bar code indicia 20. By scanning the elements of the bar code indicia 20 using a scanner unit a scan reflectance profile signal is generated. Scanning devices, such as optical laser scanners, are well known in the art. These devices are readily available in varying forms from a number of manufacturers.

Figure 1B:
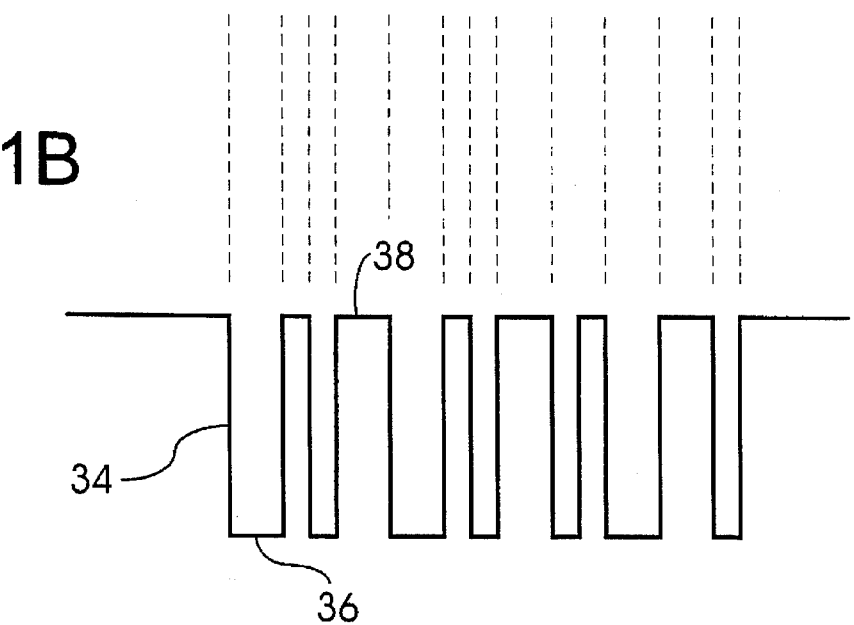

A typical scanner unit sweeps a laser beam spot 28 at nearly constant velocity across the bar code indicia 20, from left to right as shown in FIG. 1A, and produces in real-time a scan reflectance profile signal such as that shown in FIG. 1B. The idealized nature of the scan reflectance profile in FIG. 1B is characterized by the very sharp vertical edges, such as edge 34, and the very flat horizontal portions therebetween, such as reflectance level 36. It can be noted that the reflectance level 36, which represents the level of reflected light associated with a bar, is equal to the reflectance level of each bar of an idealized indicia and the corresponding portions of the scan reflectance profile. A level such as level 36 is defined as a negative peak value. It can also be noted that all negative peaks, such as 36 are considered lowest negative peaks, as all the negative peaks have the same minimum reflectance. Further, the level 38, which indicates the level of reflected light associated with a space, is equal to the level of reflectance for each space in an idealized indicia/profile. A level such as level 38 is defined as a positive peak value.

Figure 2:
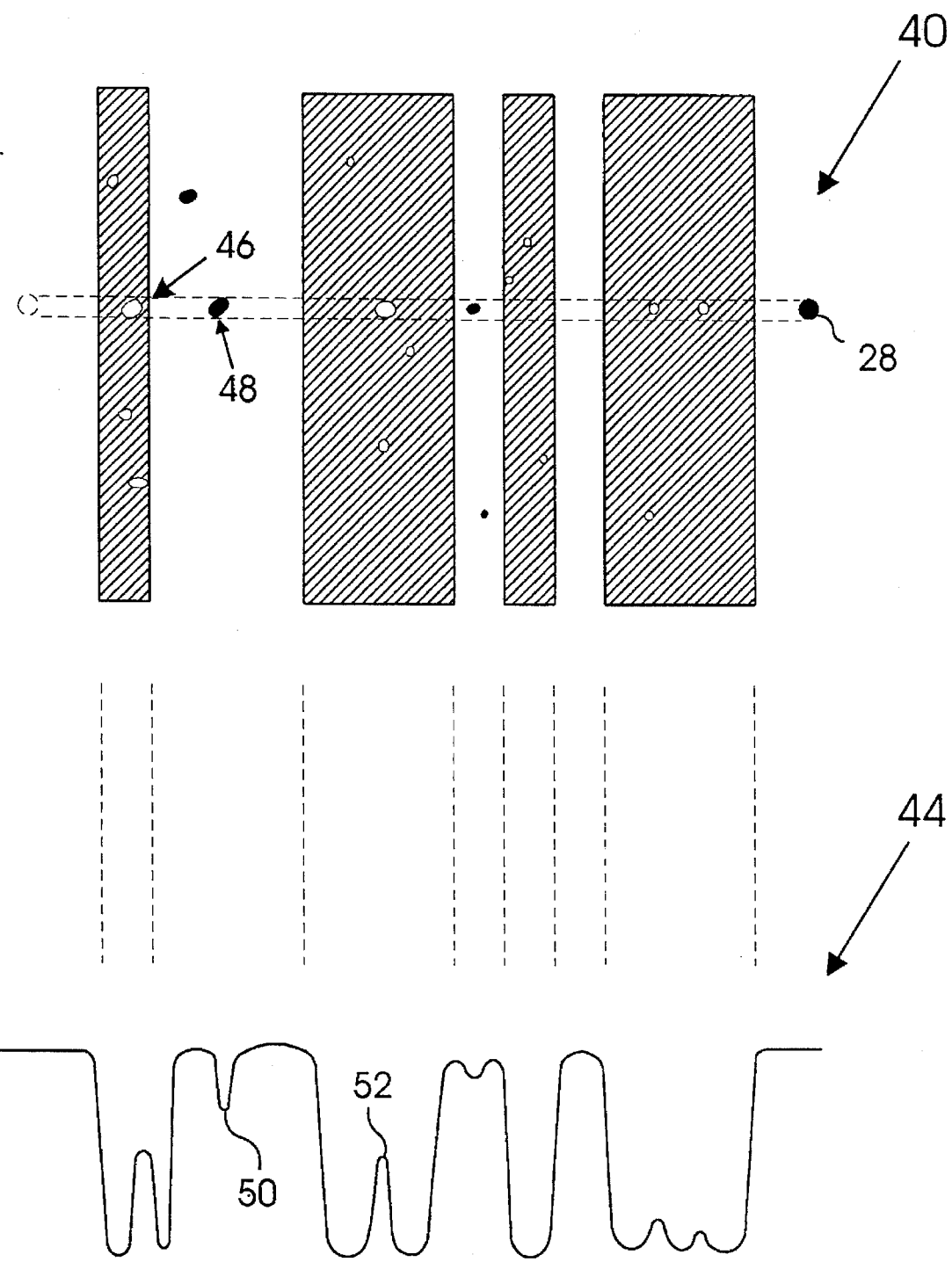
FIG. 2 depicts a portion of a non-ideal bar code indicia, along with a scan reflectance profile signal representative of the non-ideal indicia.

Referring now to FIG. 2 there is shown a portion of a non-idealized bar code indicia 40 and its representative scan reflectance profile signal 44. The enlarged elements of bar code indicia 40 are depicted with voids, such as void 46 (of the left most bar element), and with spots, such as spot 48. These kinds of print errors manifest themselves as spikes and dips when a scan reflectance profile signal 44 is generated with a scanner unit having appropriate operating characteristics. Imperfections such as negative peak 50 and positive peak 52, whether associated with a bar element or a space element, may reduce the ability of a bar code reader to properly interpret a bar code indicia. For example, a drop in the first-read rate may result, or worse yet, a substitution error may occur (i.e. an incorrect interpretation of the actual a bar code indicia's encoded digits). Methods and apparatus, such as those of the present invention, are useful when employed to evaluate the quality of printed bar code indicia, and detect and quantify such defects.

As discussed herein, the scan reflectance profile signal 44 of FIG. 2, which is generated by a scanner unit, is very often sampled and converted to a series of numerical sample values. The entire collection of sample values are stored in memory, generally as they are produced, and processed at a later time to determine at least one commonly employed quantitative figure of merit that is indicative of the quality of the bar code indicia.

For completeness, and to illustrate an important aspect of the invention, it will be helpful to define several key terms used to describe and discuss scan reflectance profile signals, as well as introduce several common figures of merit used to quantitatively evaluate and verify bar code indicia.

R(max): The largest value of reflectance for an entire scan reflectance profile signal.

R(min): The smallest value of reflectance for an entire scan reflectance profile signal.

R(b): The smallest value of reflectance within a bar element.

R(s): The largest value of reflectance within a space element.

Global Threshold: A line which may be defined midway between R(max) and R(min), and can be utilized to determine a transition point between bars and spaces. Those portions of the scan reflectance signal which are above a global threshold line are representative of spaces, while those portions below are representative of bars. An example of a global threshold level 66 is illustrated in FIG. 3.

It is important to note that the terms listed above, as well as others, may be determined by simply collecting the sample values corresponding to a highest positive peak of the reflectance value and a lowest negative peak of the reflectance value associated with each element comprising the indicia being evaluated. That is, rather than capturing a complete collection of all sample values representative of the entire scan reflectance profile for an element, a pair of peak values comprised of the highest positive and lowest negative peak (reflectance) sample values for each element will suffice. The collection of pairs of peak values for each element, when combined with a width count value indicative the width of each element will allow virtually all the figures of merit commonly used to quantitatively assess the quality of bar code indicia being evaluated.

Several examples of common figures of merit include symbol contrast (SC), edge contrast (EC), modulation, element reflectance nonuniformity (ERN), and decodability. The symbol contrast figure of merit is determined by subtracting R(min) from R(max), and is sometimes normalized with respect to the R(max) level. Edge contrast is determined for each element by taking the difference between R(s) and R(b) for adjacent elements, including the quite zones. (For the purposes of this disclosure and related discussions, the quite zones will be considered elements along with the bars and spaces comprising the bar code indicia.) Element reflectance nonuniformity, or ERN, is a quantitative figure of merit indicative of defects of the indicia, such as spots and voids. ERN is determined by taking the difference between the highest positive peak value and the lowest negative peak value within each individual element of the indicia. A defect factor may then be determined by dividing the ERN by the SC. The ANSI and UCC print quality guidelines additionally provide for the assigning of grades to items such as the symbol contrast, as well as most other figures of merit. The grade may in the form of a "numerical grade" and/or a "letter grade" and is assigned to easily quantify most figures of merit. A more complete presentation of all current figures of merit commonly employed to quantitatively evaluate bar code indicia can be found in the ANSI and UCC documents incorporated by reference in the background section. The term "figure of merit" is to be defined for the purposes of this disclosure to indicate any possible quantitative figure of merit which is included in the ANSI and UCC documents and can be determined by the processing of the highest positive and lowest negative peak sample values for each element, along with an associated width count (for each element).

Figure 3:
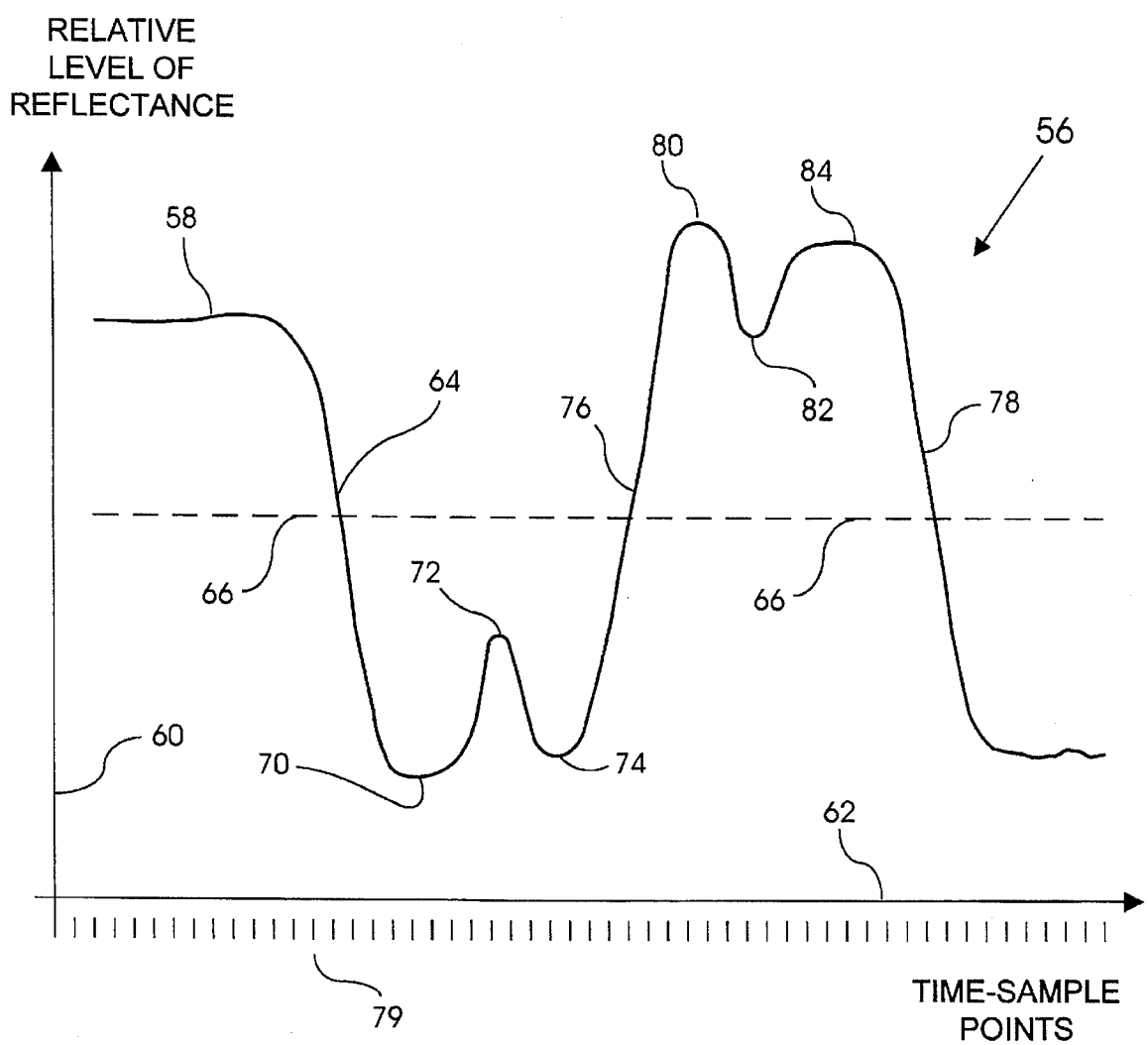
FIG. 3 is an enlarged view of a portion of a typical scan reflectance profile signal.

Referring now to FIG. 3 there is illustrated an enlarged view of a portion of a generalized scan reflectance profile signal 56. An analysis of this scan reflectance signal will better define the meaning of a highest positive peak sample value and a lowest negative peak sample value, as well as outline the method employed for the operation of the apparatus of the invention included in FIG. 3 are a pair of orthogonal axes with the horizontal axis 62 representing increasing time (from left to right) and the vertical axis 60 represents the relative level of the scan reflectance signal (decreasing from top to bottom). It may be assumed that this portion of the scan reflectance signal 56 is representative of the first two elements of a bar code indicia. It may further be assumed that a scanning spot (not shown) is sweeping from left to right across several elements of the bar code indicia to generate this portion of the scan reflectance profile signal.

A first level 58 of the scan reflectance profile 56 is known as a quite zone and is a blank, white region located adjacent to the first bar of the indicia. A first edge 64 indicates the scanning spot produced by a scanner unit is sweeping across the indicia and moving from the quite zone onto the first bar of the bar code indicia. The corresponding level of reflectance, therefore, will drop from a relatively high level to a relatively low level as the amount of light reflected from the dark bar is low with respect to the bright quite zone. This edge, as well as other edges comprising the scan reflectance signal, may be detected by a number of approaches well known in the art. For example, edges may be detected comparing the current sample value produced by an analog-to-digital converter to a previously selected global threshold value, such as level 66, as shown in FIG. 3. Another method know in the art for detecting edges is to locate zero crossings of the second derivative of the scan reflectance signal. Skilled persons will appreciate the variety of approaches that may be employed using either analog or digital techniques to detect edges such as edge 64. If the scan reflectance signal is sampled as the scan reflectance profile is generated, sample values may be processed to determine the value of a lowest negative peak 70 and a highest positive peak 72 within the current bar element. It may be noted that peak 74 represents a negative peak value, but is not of importance since it is not the "lowest" negative peak value. The process of comparing samples to the highest positive and lowest negative peak values previously determined from already processed samples would continue until edge 76 is detected. The peak values 70 and 72 may then be stored in a memory unit, or could be made available for immediate post-processing activities. The post-processing activities carried out by a post-processing computer would use peak (sample) values such as 70 and 72 to begin to determine at least one figure of merit indicative of the quality of the bar code indicia. The system would next begin evaluating samples in the same manner to determine a highest positive peak sample value and a lowest negative peak sample value for the following element represented by the portion of the scan reflectance signal between edge 76 and edge 78. That is, peak sample values associated with peaks 80 and 82 would next be determined, respectively, as shown in FIG. 3. Note, that peak 84 represents a positive peak value, but is not of importance since it is not the "highest" positive peak value. The process repeating for each element comprising the remainder of the bar code indicia being evaluated.

It must be noted that the advantage of processing sample values as they are produced to determine the highest positive and lowest negative peak sample values for each element comprising the bar code indicia is to significantly reduce, by one or more orders of magnitude, the amount of sample memory required by an evaluation and verifying system. In addition, the CPU does not need to "filter" the important points from a large collection of sample values thereby significantly reducing the required processing overhead, or alternately, the length of time needed to post-process the samples actually collected.

Additionally illustrated in FIG. 3 are a series of vertical line segments, including line segment 79, which are located below the horizontal axis 60. These line segments are represent of one possible set of sample intervals. It should be understood that typically many more samples would be required to accurately process a scan reflectance profile signal, and that the set of line segments shown are illustrative only. Since, the relative width of each element must be ascertained to determine if the bar code indicia being evaluated is decodable, one simple approach that may be utilized to measure the relative width of each element is to count the samples processed from the first edge of an element to a next adjacent edge indicating the start of the next element (and the end of the current element). The resulting count would be proportional to the relative width of an element. This method could be employed for each element comprising the bar code indicia. Those skilled in the art will appreciate the variety of methods available for determining relative element widths for the elements comprising a bar code indicia.

Figure 4:
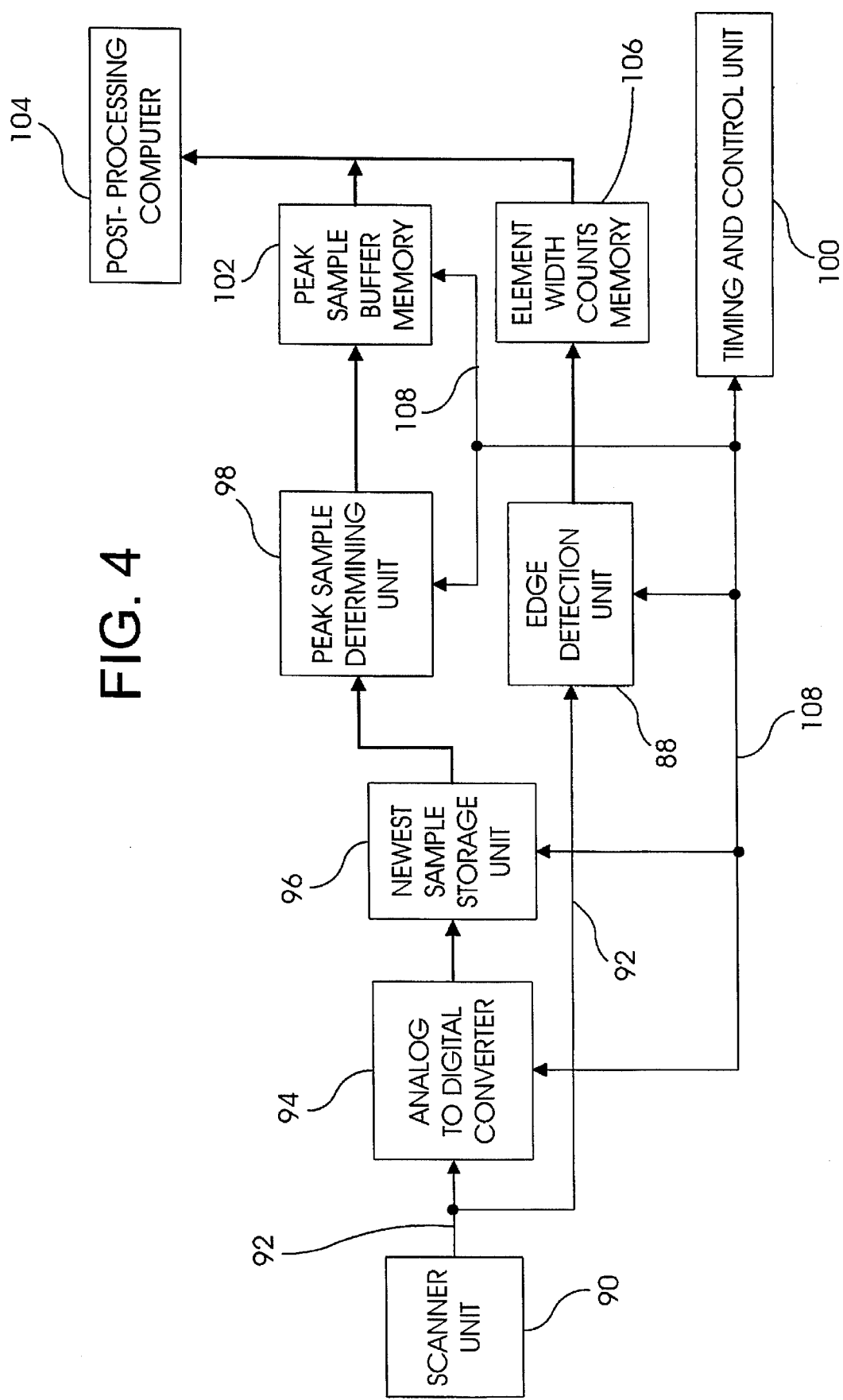
FIG. 4 is a high level block diagram for an embodiment of the invention.

Referring now to FIG. 4, an embodiment of the present invention is shown to evaluate the quality of a bar code indicia by processing a scan reflectance profile signal representative of a plurality of bars and spaces comprising the indicia. An important function provided by the embodiment of FIG. 4 is to determine the highest positive peak sample value and the lowest negative peak sample value for each element of the indicia being evaluated. These values can then be post-processed to determine at least one figure of merit indicative of the quality of the indicia under evaluation.

A scan reflectance signal 92, as shown in FIG. 4, is generated by a scanner unit 90 that is typically provided by an optical scanning type device such as a laser scanner. An edge detection unit 88 monitors the scan reflectance signal 92 to detect the occurrence of an edge indicating the start of an element of the bar code indicia. The control bus 108 is provided to enable the various units of the embodiment of FIG. 4 to communicate (i.e. using signal levels) and pass information, including commands, back and forth between units as required. For example, at the detection of a first edge of the scan reflectance signal 92, the timing and control unit 100 may be arranged to initialize various components of the present embodiment (via the control bus 108) and to initiate sampling of the scan reflectance signal 92 by an analog-to-digital converter 94. Each sample produced by the analog-to-digital converter 94 is representative of the analog value of the reflectance level of the element presently being scanned. As samples are produced they are loaded into a newest sample storage unit 96. It should be noted that the newest sample storage unit 96 may actually be incorporated into the analog-to-digital converter 94. A peak sample determining unit 98 determines if the current sample in the newest sample storage unit 96 is either the highest positive peak sample value or the lowest negative peak sample value produced from the scan reflectance signal for that element. If not, the value is not stored in the peak sample determining unit 98, and will be lost when the next sample is produced by the analog-to-digital converter 94 (and stored in the newest sample storage unit 96). However, if the present value in the newest sample storage unit 96 is higher or lower, respectively, than any previous positive peak or negative peak sample value, the current sample value in the newest sample storage unit 96 is loaded into the peak sample determining unit 98. This process will continue until the edge detection unit 88 detects a next edge indicative of the start of the next element (and the end of the current element). With the detection of an edge, the highest positive peak sample value and the lowest negative peak sample value determined and stored in the peak sample determining unit 98 are then stored in a peak sample buffer memory 102 for subsequent post-processing by a device such as a post-processing computer 104. The process of sampling the scan reflectance signal 92 continues until the highest positive peak sample value and the lowest negative peak sample value are determined for each element of the bar code indicia. These peak value pairs, along with the relative widths of the elements, enable figures of merit indicative of the quality of the bar code indicia to be determined.

As depicted in FIG. 4, the edge detection unit 88 of this embodiment is configured to further determine an element width count that is equal to the number of samples associated with each element. At the occurrence of an edge, indicating the end of an element, the element width count value may be loaded into an element width counts memory 106. The element width count values are typically used to determine the relative widths of the elements comprising the indicia being evaluated, and as such are useful for determining figures of merit associated with decode and decodability evaluation. It is possible to provide the width counting function with a separate unit interposed between the edge detection unit 88 and the element width counts memory 106, and such a variation is contemplated as being within the scope of the invention.

It should be understood that it is also contemplated that the present invention may be arranged to eliminate the peak sample buffer memory 102 and/or the element width counts memory 106, and supply the values of the highest positive peak sample value, the lowest negative peak sample value, and the element width count value (just determined for an element) directly to a post-processing computer, such as the post-processing computer 104.

It must also be noted that the functions of the peak sample determining unit 98, the edge detection unit 88, and the peak sample buffer memory 102 of the embodiment of the FIG. 4 may be realized employing a hardware/software (or hardware/firmware) solution, such as an embodiment including a high speed digital signal processing (DSP) computer. In which case the pairs of peak sample values determined for each element, along with the element width counts, may be output to a second computer system, such as the post-processing computer 104 for post-processing. Alternatively, a hardware embodiment may be employed using digital logic functions implemented with standard integrated logic devices or programmable logic devices. A more detailed description of a logic based embodiment comprising digital logic functions will be discussed later. With the current state of technology, a most preferred embodiment contemplated, for both cost and highest speed considerations, is a hardware implementation employing digital logic functions to collect the peak sample value pairs and element width count values for each element. The digital logic functions may be realized by discrete integrated devices (to provide individual logic functions) or by a variety of programmable logic devices (PLDs) currently available. Skilled persons will recognize the variety of solutions available to implement the embodiment of FIG. 4

Turning again to FIG. 4, there is provided a timing and control unit 100. The timing and control unit 100 is provided to coordinate the activities of the various units of the present embodiment. For example, when the edge detection unit 88 detects a first edge indicative of the start of the first element (a bar) of the bar code indicia, timing and control unit 100 may signal (via control bus 108) for the analog-to-digital converter 94 to begin sampling the scan reflectance signal 92. Also, when an edge is detected by edge detection unit 88, timing and control unit 100 may be arranged to enable (again via the control bus 108) the peak sample determining unit 98 to store the highest positive and lowest negative peak sample values determined for the previous element into the peak sample buffer memory 102. It should be understood that the timing and control unit 100, which may also act as a clock source to clock various units included in the embodiment of FIG. 4, may be implemented using discrete or programmable logic devices (possibly including a high speed microcontroller type device).

Figure 5A:
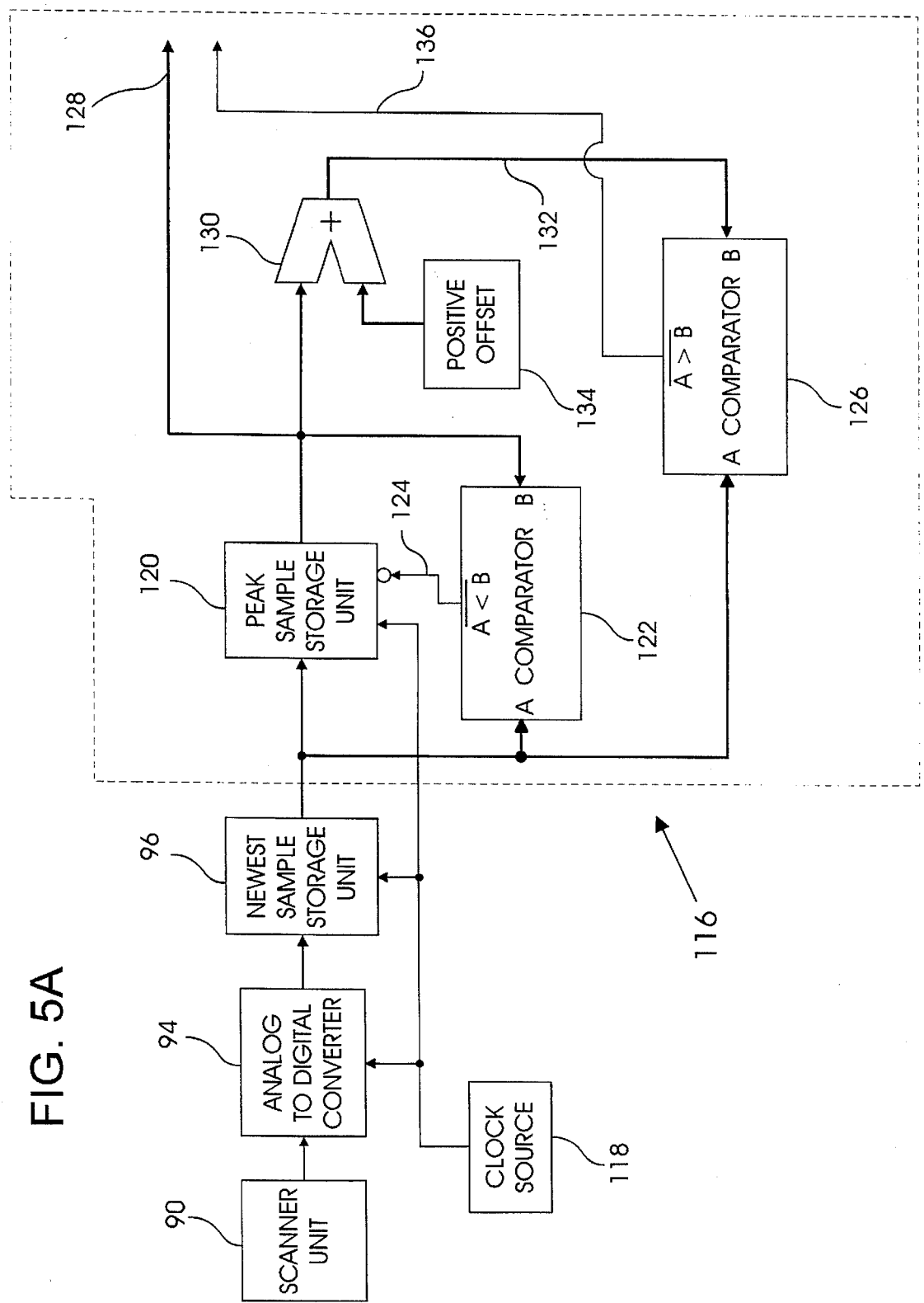
FIG. 5A is a functional block diagram of an embodiment of a negative peak determining unit to collect a negative peak sample value.

Referring now to FIG. 5A, there is provided a functional block diagram of an embodiment of a negative peak determining unit 116 to determine negative peak sample values. The functions of the scanner unit 90, the analog-to-digital converter 94 and the newest sample storage unit 96 are equivalent to the embodiment of FIG. 4. With this embodiment a clock source 118 is provided to clock the analog-to-digital converter 94 to produce samples and to further clock samples values into the newest sample storage unit 96, and selectively into a peak sample storage unit 120, as will be discussed. The peak sample storage unit 120 is responsive to a first comparator 122. The first comparator 122 is arranged to compare the relative magnitudes of the sample values stored in the peak sample storage unit 120 and the newest sample storage unit 96. Initially, the peak sample storage unit 120 would be set to the highest value that the analog-to-digital unit 94 can produce. As samples are produced by the analog-to-digital converter 94 and stored in the newest sample storage unit 96, the comparator 122 determines if the sample value of the newest sample storage unit 96 is less (lower) than the sample value stored in the peak sample storage unit 120. If the newest sample value is less than the value of the peak sample storage unit 120, the new sample may represent a new negative peak value. The first comparator 122 provides a first control signal 124 to enable the peak sample storage unit 120 so the new sample value is stored (if it is a lower value) in the peak sample storage unit 120. This process of storing lower valued samples in the peak sample storage unit 120 continues until a negative peak value is stored. At the point in time when the sample values produced by the analog-to-digital converter 96 begin to increase in relative magnitude when compared to the sample value stored in the peak sample storage unit 120 (i.e. after a negative peak occurs in the reflectance profile signal), a negative peak value has been determined and is now stored in the peak sample storage unit 120. At this point, the first control signal 124 no longer enables the peak sample storage unit 120, and the negative peak sample value stored in the peak storage unit 120 is preserved.

Due to the presence of noise, especially in digital electronic systems, a newest sample value may at any time be slightly larger than a previous sample. The next sample, or a later sample, may again be at a lower value than the sample value that is stored in the peak sample storage unit 120. In consideration of this possibility, a summing unit 130 is included in the embodiment of FIG. 5A to generate a threshold value 132. The threshold value 132 is equal to the sum of the sample value of the peak sample storage unit 120 and an appropriate positive offset 134. The value selected for the positive offset 134 is such that negates the affect of noise in the system with respect to determining when the sample values begin to actually increase in relative magnitude. At minimum the magnitude of the positive offset must be greater than the noise level of the system. Alternately, the positive offset may be dynamically varied, for example, as a percentage of the peak value. As shown in FIG. 5A, a second comparator 126 determines when the threshold value 132 is of a lower relative magnitude than the sample value of the newest sample storage unit 96. That is, the sample value in the newest sample storage unit 96 must rise to a high enough level, well above the noise level present in the system, so that the second comparator 126 does not falsely indicate via a second control signal 136, that a negative peak value has been determined. As a result, the second comparator 126 produces an active value on the second control signal 136 (indicating a negative peak has been found) at a point in time after the peak sample value has been determined and stored in the peak storage unit 120. The value of the peak sample storage unit 120 may then be saved and/or compared to previous negative peak sample values to determine if it is a lowest negative peak sample value.

It should be noted that the second control signal 136 and the output 128 of the peak sample storage unit 120 of FIG. 5A may also be utilized along with a third comparator and an additional lowest peak storage unit (both not shown in FIG. 5A) to determine if the negative peak value just determined and stored in the peak sample storage unit 120 (and accessible on output 128) is indeed a lowest negative peak value. This arrangement will be discussed further when referring to the embodiment of FIG. 6.

Once a negative peak value has been determined by the embodiment of FIG. 5A, a second peak determining unit arranged to collect a positive peak sample value may be employed to determine the next positive peak. One skilled in the art will appreciate that every negative peak must be followed by a positive peak, and visa versa. Although minor peaks that are above the level of the threshold signal 132 may be missed if the threshold value 132 is set at too high a level, the impact on the peak samples collected and the associated figures of merit is not important as the most negative peak values will always be determined.

Figure 5B:
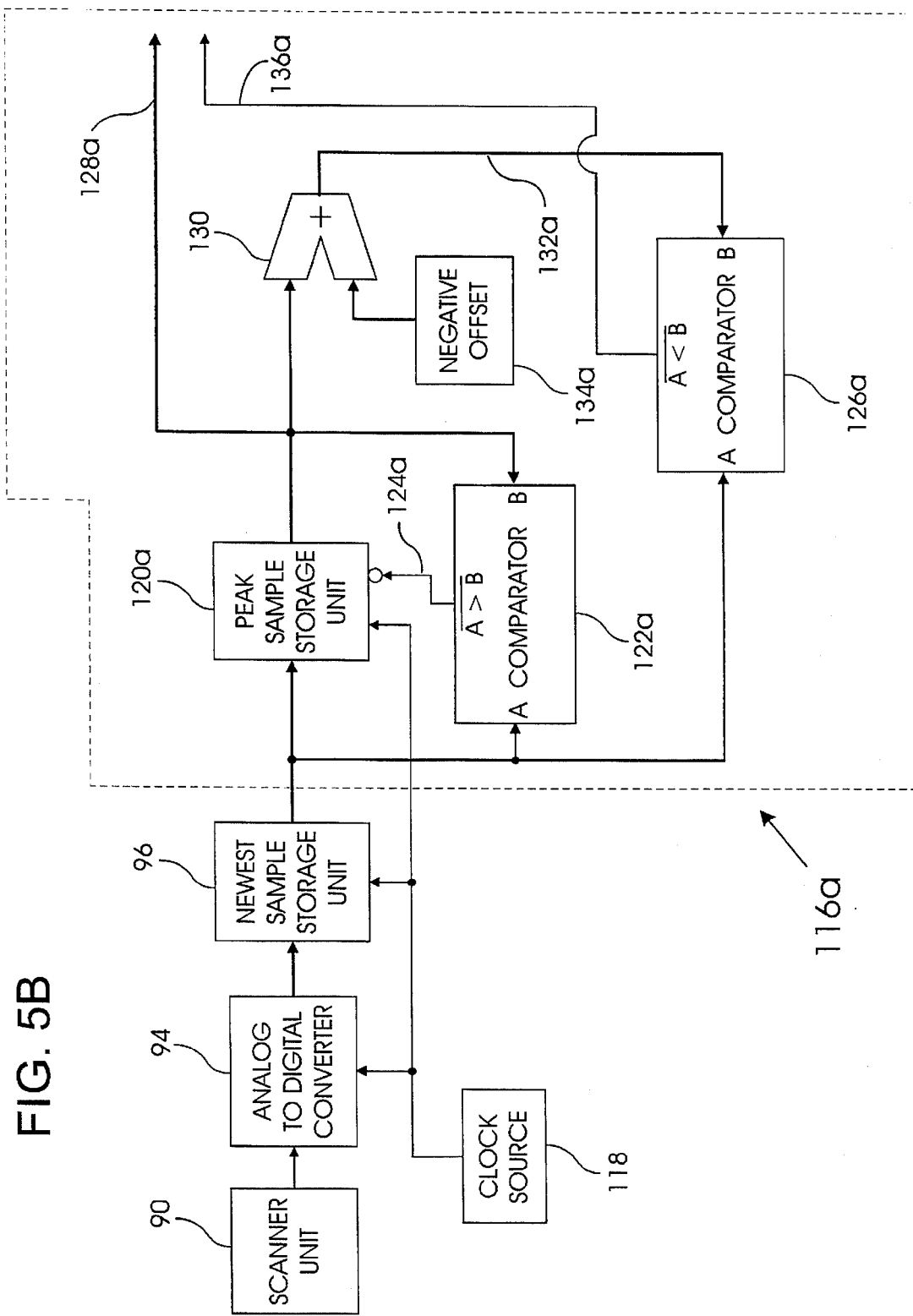
FIG. 5B is a functional block diagram of an embodiment of a positive peak determining unit to collect a positive peak sample value.

Referring now to FIG. 5B illustrated is a functional block diagram of an embodiment of a positive peak determining unit 116a to determine positive peak sample values. The structure and operation of the positive peak determining unit of FIG. 5B is very similar to that of the negative peak determining unit of FIG. 5A, with the exception that this embodiment is configured to determine positive peak values. The functions of the scanner unit 90, the analog-to-digital converter 94, the newest sample storage unit 96, and the clock source 118 are equivalent to the embodiment of FIG. 5A. A peak sample storage unit 120a is responsive to a first comparator 122a, which is arranged to compare the relative magnitudes of the sample values stored in the peak sample storage unit 120a and the newest sample storage unit 96. In order to determine the value of a positive peak, the peak sample storage unit 120a must initially be set to the lowest value that the analog-to-digital converter 94 can produce. As samples are generated by the analog-to-digital converter 94, the comparator 122a determines if the newest sample value stored in the newest sample storage unit 96 is greater (higher) than the value of the peak sample storage unit 120a. If the newest sample value is higher, the newest sample may represent a new positive peak value and the first comparator 122a provides a first control signal 124a to enable the peak sample storage unit 120a allowing the new sample value to be stored (in the peak sample storage unit 120a). This process of storing higher valued samples continues, until at point in time when the sample values produced by the analog-to-digital converter 96 begin to decrease in relative magnitude when compared to the sample value stored in the peak sample storage unit 120a (i.e. after a positive peak occurs). At this point a positive peak value has been determined and stored in the peak sample storage unit 120a, and the first control signal 124a no longer enables the peak sample storage unit 120. Therefore, as desired, the positive peak sample value stored in the peak storage unit 120a is to preserved.

Further provided with the embodiment of FIG. 5B is a summing unit 130 included, as with the embodiment of FIG. 5A, to provide noise immunity. However, in this embodiment the polarity of the offset value produced by the negative offset 134a, is negative. A second comparator 126a is arranged to determine when a threshold signal value 132a, now adjusted by the value of the negative offset 134a to be lower in magnitude then the value stored in the peak sample storage unit 120a, is higher than the magnitude of the sample value stored in the newest sample storage unit 96. Therefore, the sample value in the newest sample storage unit must drop to a low enough level (below the system noise level), before a second comparator 126a provides a second control signal 136a to indicate a positive peak value has been determined. By using the second control signal 136a to indicate when a positive peak value has been determined, along with the output 128a of the peak sample storage unit 120a, the value of peak sample storage unit may be saved and/or compared to a previous positive peak value to determine if the value of the peak sample storage unit is a new highest positive peak sample value.

An astute observer, and certainly one skilled in the art, will notice the redundancy of the embodiments of FIG. 5A and FIG. 5B. For example, with the exceptions of the "sense" of the comparisons provided by the first and second comparators, and the sign of the offset value, these two embodiments are equivalent. It should therefore be possible to combine the embodiments of FIGS. 5A and 5B to provided an embodiment which can alternately determine negative sample values and positive sample values, and in the process reduce the redundancy of the embodiments of FIG. 5A and FIG. 5B. In addition, by using the control signals 136 and 136a of FIGS. 5A and 5B, respectively, additional units (i.e. storage and comparator units) may be added to determine and store the highest positive and lowest negative peak sample values for an element.

Figure 6:
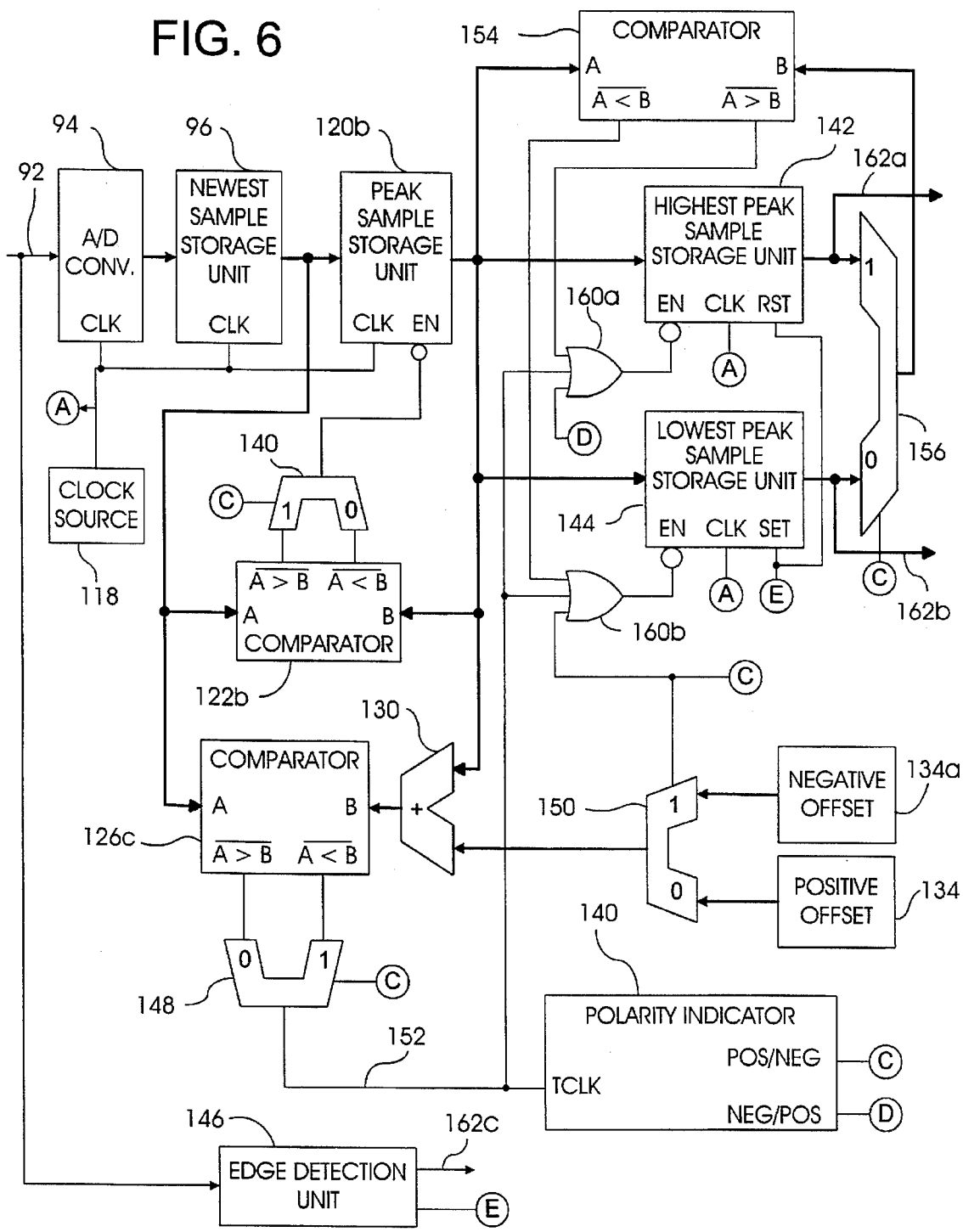
FIG. 6 provides a functional block diagram of an embodiment of the invention for determining the highest positive peak sample value and the lowest negative peak sample value for a portion of a scan reflectance signal representative of an element of a bar code indicia.

Referring now to FIG. 6 there is provided a functional block diagram of an embodiment of the invention for determining positive peak sample values and negative peak sample values of a scan reflectance signal representative of an element of a bar code indicia. One full cycle of operation of this embodiment will determine a single pair of peak values consisting of a lowest negative peak sample value and a highest positive peak sample value. These peak values, when determined, may be saved in a buffer memory or be made immediately available to begin post-processing to determine at least one figure of merit indicative of the quality of the indicia being evaluated.

Turning again to FIG. 6, central to this embodiment is a polarity indicator 140 having two output signals C and D. Output signals C and D may be assumed to be digital in nature and switchable between a low logic level and a high logic level. Signals C and D will configure the embodiment of FIG. 6 to alternately determine negative peak sample values and positive peak sample values. As each peak sample value is determined, it will be checked to further determine if the newest peak value represents a lowest negative or highest positive peak sample value.

To clearly understand the operation of the embodiment of FIG. 6, it is important to understand the required initial conditions of various items comprising the embodiment. First the signal C is set to a high logic level, while signal D is reset to a low logic level. The signals C and D may essentially be considered complement signals—when one is high the other is low, and visa-verse. Second, highest peak sample storage unit 142 and lowest peak sample storage unit 144 would be loaded with the lowest and highest sample values, respectively, the analog-to-digital converter 94 can produce. For example, for an 8-bit analog-to-digital converter the highest peak sample storage unit 142 would be loaded with an initial value of zero (0) and the lowest peak sample storage unit 144 would be loaded with an initial value of 255. Although, the peak sample storage unit 120b is shown in a simplified form, it should be understood that the peak sample storage unit must be capable of being initialized with the highest possible sample value when determining a negative peak value and initialized with the lowest possible sample value when determining a positive peak value. To simplify the FIG. 6 embodiment, the peak sample storage unit is shown in a basic form. However, a skilled person would be able to add the required logic (either hardware or software implemented) to provide for the proper initializing of the peak sample storage unit 120b. At the start of the analysis of a bar code indicia, the peak sample storage unit 120b would be initialized to determine a negative peak value. As negative or positive peak sample values are determined, the peak sample storage unit 120b would be reloaded with the appropriate initial values in the manner as described with the embodiments of FIGS. 5A and 5B. Further, the initializing of peak sample value unit 120b would easily be supported by logic signals such as signals A, C, D, and a third signal E, provided by an edge detection unit 146.

As the scan reflectance signal 92 is generated by a scanner unit (not shown in FIG. 6), an edge detection unit 146 monitors the scan reflectance signal 92 to detect the occurrence of a first edge indicating the start of an element of the bar code indicia. At the occurrence of the first edge a signal would be provided by signal E to initialize the peak sample storage unit 120b, the highest peak sample storage unit 142, and the lowest peak sample storage unit 144 with an appropriate set of initial values. The particular set of initial values are a function of the element (a bar or space) to be sampled. After signal E is provided to initialize the required storage units, the sampling of the scan reflectance signal 92 by the analog-to-digital converter 94 would commence. As each new sample is stored in the newest sample storage unit 96, first comparator 122b compares the value of the new sample to the value of the sample in the peak storage unit 120b. Comparator 122b produces a pair of control signals, one indicating if the new sample value is "greater than" the value in the peak sample storage unit 120b and a second indicating if the value is "less than" the respective values. A first multiplexer 140 is arranged to couple the appropriate signal, either the "A greater than B" or the "A less than B" signal, to enable the peak sample storage register 120b. For example, when determining a negative peak sample value, signal C would be at a low logic level and configure the first multiplexer 140 to couple the "A less than B" control signal to enable the peak sample storage unit 120b. As samples are produced and processed, new sample values would update the peak sample storage unit 120b when new lower sample values are determined. Thus, as with the embodiments of FIGS. 5A and 5B, the peak sample storage unit is responsive to the first comparator in that the decision as to update or not update the peak sample storage unit 120b is made by the first comparator 122b (via the first multiplexer 140).

The functions provided by the second comparator 126c, the summing unit 130 and the offsets 134 and 134a are equivalent to those discussed for the embodiments of FIGS. 5A and 5B. Additionally included in the embodiment of FIG. 6 are a second multiplexer 148 and a third multiplexer 150. The second multiplexer 148 is provided to selectively couple either a "greater than" or a "less than" control signal produced by the second comparator 126c (to various components of the present embodiment) as determined by signal C. When determining a negative peak sample value the "A greater than B" control signal provided by the second comparator 126c is coupled to these components, and when determining a positive peak sample value the "A less than B" control signal from the second comparator 126c is coupled. Similarly, the third multiplexer 150 couples the positive offset 134 or the negative offset 134a, respectively, to summing unit 130. The control signal 152 provided by multiplexer 148 is used for several purposes. (Functionally, this signal is equivalent to the signals 136 and 136b of FIGS. 5A and 5b, in that the signal indicates when a peak sample value has be determined.) A first use of control signal 152 is to clock or trigger the polarity indicator 140. Thus, when a negative or positive peak sample value has been determined, the polarity unit is toggled to configure the embodiment of FIG. 6 to search for a peak of opposite polarity to the peak just determined. Also control signal 152 is used to determine if the peak value just found should be stored as a new highest positive or lowest negative peak sample value, as will be discussed further.

Further provided with the embodiment of FIG. 6 is a third comparator 154 and a forth multiplexer 156. The third comparator 154 is provided to determine when a sample value stored in the peak sample storage unit 120b is a new highest positive or lowest negative peak sample value and should therefore be used to update the value stored in the highest peak sample storage unit 142 or the lowest peak sample storage unit 144, respectively. If the sample value stored in the peak sample storage unit 120b is not a new peak value the previous peak values are preserved. To facilitate the storage of new highest/lowest peak sample values a first gate 160a is provided to enable the highest peak sample storage unit 142 if three conditions are satisfied. First, the polarity indicator must indicate that a positive peak is being determined by providing a logic low level with signal D. (Signal C would, therefore, be at a high logic level.) Next, the second comparator 126c must indicate (via second multiplexer 148) that a peak value has been determined and stored in the peak sample storage unit 120b. And finally, the third comparator 154 must indicate that the sample value stored in the peak sample storage unit 120b is greater than the value currently in the highest peak storage unit 142. If all three conditions are satisfied, a new highest positive peak sample value is stored in storage unit 142. In a similar manner a second logic gate 160b is provided to determine if a new lowest negative peak sample value should be stored in the lowest peak sample storage unit 144 by enabling it at the appropriate times.

At a point in time when the edge detection unit 146 detects an edge indicating the end of the present element (just sampled and processed) the values stored in the highest peak sample storage unit 142 and the lowest peak sample storage unit 144 may be loaded into a memory device, such as a FIFO, or made immediately available for post-processing. The control signal 162c is provided to indicate the values presently stored in the highest peak sample storage unit 142 and the lowest peak sample storage unit 144 are valid (as highest positive and lowest negative peak values). In the simplest case, signal 162c may be used to clock the values of peak storage units 142 and 144 into a FIFO memory. The processing of samples representative of the next element would then commence by initializing the various storage units to the appropriate initial values utilizing signal E, and the next group of samples would be processed to determine the next pair of highest positive and lowest negative peak sample values.

It can be noted that if either the highest peak sample storage unit 142 or the lowest peak sample storage unit 144 contains the value that was initially loaded at the start of the sampling, then a peak of the corresponding polarity was not found. For example, if after the sampling of an element is complete, the value of the highest peak sample storage unit 142 is still set to zero, then it may be assumed that no positive peaks were determined. (The previous example would generally only occur when sampling a portion of the scan reflectance signal associated with a bar element of high quality.)

It should also be noted that the embodiment of FIG. 6 is intended to be representative of implementations which may be provided by hardware based embodiments, or by hardware/software (or hardware/firmware) based solutions that incorporate, for example, DSP like sub-systems. Indeed, skilled persons will understand the variety of such implementations available in the art. A preferred embodiment of the present invention may be implemented with a Personal Computer (PC) having an expansion plug-in card. The expansion plug-in card including an implementation of the embodiment of FIG. 6. The PC would then serve as a post-processing computer. Yet other stand-alone embodiments, utilizing an embedded computing unit are possible. It is contemplated that the present invention includes all such embodiments that process in real-time sample values produced from a scan reflectance signal to determine highest positive and lowest negative peak sample values for each element comprising a bar code indicia, wherein the peak sample values determined are post-processed (along with width counts for each element) to determine at least one figure of merit indicative of the quality of the indicia.

While there have been described the currently preferred embodiments of the present invention, those skilled in the art will recognize that other and further modifications may be made without departing from the invention and it is intended to claim all modifications and variations as fall within the scope of the invention and the appended claims.

What is claimed is:

1. A method for evaluating the quality of a bar code indicia by processing a scan reflectance profile signal representative of elements of the bar code indicia, the scan reflectance profile signal generated by scanning the bar code indicia, said method comprising the steps of:

a) detecting a first edge of the scan reflectance signal as the bar code indicia is being scanned, the first edge indicating the beginning of a first element of the bar code indicia;

b) sampling a portion of the scan reflectance signal representative of said element to produce a sequence of sample values;

c) processing said sequence of sample values of step b) as each sample value is produced to determine a highest positive peak sample value and a lowest negative peak sample value provided by said sequence of sample values associated with said element being scanned and sampled;

d) detecting a next edge of the scan reflectance signal indicating the end of said element and the start of the scanning and sampling of an adjacent element;

e) storing into a peak sample buffer memory said highest positive and lowest negative peak sample values determined in step c); and f) repeating steps b), c), d) and e) for a plurality of adjacent elements that along with the first processed element form the bar code indicia;

said highest positive peak and lowest negative peak sample values stored in step e) for each element scanned being accessible in said peak sample buffer memory for post-processing to determine at least one figure of merit associated with the quality of the bar code indicia.

2. The method of claim 1 further comprising the step of post-processing said highest positive and lowest negative peak sample values for each element comprising the bar code indicia to determine at least one figure of merit indicative of the quality of the bar code indicia being evaluated.

3. The method of claim 1 wherein a plurality of scan reflectance profile signals generated by scanning the bar code indicia at spaced locations along the height of the elements of the bar code indicia are processed in succession to determine said highest positive and lowest negative peak sample values for each element comprising the bar code indicia for each said scan reflectance profile signal generated.

4. The method of claim 3 further comprising the step of post-processing said highest positive and lowest negative peak sample values determined for each element of each scan reflectance profile signal processed to determine at least one figure of merit indicative of the overall quality of the bar code indicia being evaluated.

5. The method of claim 1 wherein detecting an edge within the scan reflectance signal in step d), causes an element width count to be stored in an element width buffer memory at step d);

said storing of element width counts continuing until all portions of the scan reflectance profile signal representative of the elements of the bar code indicia are processed.

6. The method of claim 5 further comprising the step of post-processing said highest positive peak sample value, said lowest negative peak sample value, and said element width count value determined for each element to determine at least one figure of merit indicative of the quality of the bar code indicia being evaluated.

7. A method for evaluating the quality of a bar code indicia by processing a scan reflectance profile signal representative of the elements of the bar code indicia, the scan reflectance profile signal generated by scanning the bar code indicia, said method comprising the steps of:

a) sampling the scan reflectance signal to provide a sequence of sample values representative of each element of the bar code indicia; and b) processing each sample value of said sequence of sample values as each sample is produced in step a) to determine a highest positive peak sample value and a lowest negative peak sample value associated with each element of the bar code indicia;

thereby determining a plurality of pairs of peak sample values, each pair consisting of said highest positive and lowest negative peak sample values for each scanned element, each of said pairs of peak sample values being accessible for post-processing to determine at least one figure of merit indicative of the quality of the bar code indicia.

8. The method of claim 7 further comprising the step of storing said highest positive and lowest negative peak sample values in a peak sample buffer memory as they are determined in step b).

9. The method of claim 7 wherein a plurality of scan reflectance profile signals generated at spaced locations along the height of the elements comprising the bar code indicia are processed in succession to determine said highest positive and lowest negative peak sample values for each element comprising said bar code indicia for each scan reflectance profile signal generated;

said highest positive and lowest negative peak sample values being accessible to determine at least one figure of merit indicative of the overall quality of the bar code indicia being evaluated.

10. The method of claim 9 further comprising the step of post-processing said highest positive and lowest negative peak sample values determined for each element of each scan reflectance profile signal processed to determine at least one figure of merit indicative of the overall quality of the bar code indicia being evaluated.

11. An apparatus for evaluating the quality of a bar code indicia by processing a scan reflectance profile signal representative of elements of the bar code indicia, the scan reflectance profile signal processed as it is generated by a scanner unit arranged to scan the bar code indicia, said apparatus comprising:

an analog-to-digital converter to sample the scan reflectance profile signal as it is generated by said scanner unit, said analog-to-digital converter producing a sequence of samples, each sample having a value representative of the analog value of the scan reflectance signal;

an edge detection unit to detect edges within the scan reflectance profile signal, the edges indicating the start of each element within the bar code indicia; and a peak sample determining unit that is coupled to the analog-to-digital converter, said peak sample determining unit provided to determine a highest positive peak sample value and a lowest negative peak sample value for each element from the sample values produced by said analog-to-digital converter as each element within the bar code indicia is scanned;

said highest positive and lowest negative peak sample values determined for each element already scanned being immediately accessible to begin post-processing to determine at least one figure of merit indicative of the quality of the bar code indicia being evaluated.

12. The apparatus of claim 11, further comprising a peak sample buffer memory to store said highest positive and lowest negative peak sample values as said values are determined by said peak sample determining unit for each scanned element of the bar code indicia.

13. The apparatus of claim 12, further comprising a post-processing computer to read and post-process said peak sample values stored in said peak sample buffer memory to determine at least one figure of merit indicative of the quality of the bar code indicia.

14. An apparatus for evaluating the quality of a bar code indicia by processing a scan reflectance profile signal representative of elements within the bar code indicia, the scan reflectance profile signal generated by a scanner unit and sampled by an analog-to-digital converter to produce a sequence of samples, each sample representative of the analog value of the scan reflectance signal, said apparatus comprising:

an edge detection unit to detect edges within the scan reflectance profile signal, the edges indicating the start of each of the elements of the bar code indicia; and a peak sample determining unit coupled to the analog-to-digital converter, said peak sample determining unit provided to determine, for each element a highest positive peak sample value and a lowest negative peak sample value from the sample values produced by said analog-to-digital converter as each element within the bar code indicia is scanned;

wherein said highest positive and lowest negative peak sample values determined for already processed elements are accessible to begin post-processing to determine at least one figure of merit indicative of the quality of the bar code indicia.

15. The apparatus of claim 14, further comprising a peak sample buffer memory to store said highest positive and lowest negative peak sample values determined for each element of said bar code indicia until said peak sample values are needed for post-processing.

16. The apparatus of claim 15, further comprising a post-processing computer to post-process said peak sample values stored in said peak sample buffer memory to determine at least one figure of merit indicative of the quality of the bar code indicia.

17. An apparatus to enable the evaluation of the quality of a bar code indicia by processing a scan reflectance profile signal representative of the elements within the bar code indicia as the scan reflectance profile is generated to determine a highest positive peak sample value and a lowest negative peak sample value of each element, the scan reflectance profile signal generated by a scanner unit arranged to scan the bar code indicia, said apparatus comprising:

an analog-to-digital converter, to sample the scan reflectance signal as it is generated by said scanner unit, to produce a sequence of sample values representative of the analog value of the scan reflectance signal;

an edge detection unit to detect edges within the scan reflectance profile signal, the edges indicating the beginning of elements of the bar code indicia and further indicative of the end of each of said elements and when said highest positive and lowest negative peak sample values have been determined for each scanned element;

a polarity indicator to indicate a polarity of a peak sample value to next be determined, said polarity being indicated by a first logic level when determining a positive peak sample value or a second logic level when determining a negative peak sample value; and a peak sample determining unit to determine said highest positive peak sample value and said lowest negative peak sample value from the sample values provided by said analog-to-digital converter as each element within the bar code indicia is scanned, said peak sample determining unit having:

a peak sample storage unit responsive to a first comparator, said first comparator producing a first control signal to enable said peak sample storage unit to store a current sample produced by said analog-to-digital converter if said current sample value is of the proper relative magnitude so as to represent a possible new peak value with respect to the polarity indicated by said polarity indicator;

a second comparator for comparing the relative magnitude of said current sample to the relative magnitude of a value being equal to a sum of the sample value currently stored in said peak sample storage unit and an offset value, said second comparator indicating when a peak value has been determined and providing a second control signal to said polarity indicator to configure said peak sample determining unit to determine a peak of opposite polarity to the peak just determined; and a highest peak sample storage unit to store said highest positive peak sample value and a lowest peak sample storage unit to store said lowest negative peak sample value, each of said peak sample value stored being determined from the sequence of sample values produced by said analog-to-digital converter as each element of the bar code indicia is scanned and sampled;

said highest and lowest peak sample storage units being responsive to a third comparator in combination with said second control signal, said third comparator included to compare the relative magnitudes of said value stored in said peak sample storage unit and said value currently stored in said highest peak sample storage unit or said lowest peak sample storage unit as determined by said polarity indicator, and storing said value of said peak sample storage unit in said highest peak sample storage unit or said lowest peak sample storage unit when said third comparator determines that a new highest positive or lowest negative peak sample value has been determined;

said polarity indicator configuring the peak sample determining unit to alternately determine opposite polarity peak sample values until the edge detection unit detects an edge of the scan reflectance profile signal indicating that said highest positive and lowest negative peak sample values have been determined for the element currently being scanned and processed.

18. The apparatus of claim 17, further comprising a peak sample buffer memory to hold said highest positive and lowest negative peak sample values determined for each scanned element of said bar code indicia until said peak sample values are needed for post-processing.

19. The apparatus of claim 18, further comprising a post-processing computer to receive and post-process said peak sample values stored in said peak sample buffer memory to determine at least one figure of merit indicative of the quality of the bar code indicia.

20. An apparatus to process a sequence of sample values representative of a portion of a scan reflectance profile signal generated by a scanner unit scanning elements of a bar code indicia, said sample values produced by an analog-to-digital converter arranged to sample the scan reflectance signal as it is generated, said apparatus processing each sample of said sequence of sample values as each sample is produced to determine a highest positive peak sample value and a lowest negative peak sample value for each element as each element is scanned, said apparatus comprising:

a polarity indicator to indicate a polarity of a peak sample value to be determined, said polarity being indicated by a first logic level when determining a positive peak sample value and a second logic level when determining a negative peak sample value;

a peak sample storage unit responsive to a first comparator, said first comparator producing a first control signal to enable said peak sample storage unit to store a current sample produced by said analog-to-digital converter if said current sample is of the proper relative magnitude so as to represent a possible new peak sample value with respect to the polarity indicated by said polarity indicator;

a second comparator for comparing the relative magnitude of said current sample to the relative magnitude of a value being equal to a sum of the sample value currently stored in said peak sample storage unit and an offset value, said second comparator indicating when a peak value has been determined and providing a second control signal to said polarity indicator to configure said apparatus to determine a peak of opposite polarity to the peak just determined; and a highest peak sample storage unit to store said highest positive peak sample value and a lowest peak sample storage unit to store said lowest negative peak sample value, each of said highest positive and lowest negative peak sample values stored being determined from the sequence of sample values produced by the analog-to-digital converter as each element of the bar code indicia is scanned;

said highest and lowest peak sample storage units being responsive to a third comparator in combination with said second control signal, said third comparator included to compare the relative magnitudes of said value stored in said peak sample storage unit and said value currently stored in said highest peak sample storage unit or said lowest peak sample storage unit as determined by said polarity indicator, and storing said value of said peak sample storage unit in said highest peak sample storage unit or said lowest peak sample storage unit when said third comparator determines that a new highest positive or lowest negative peak sample value has been determined by the processing of said sequence of sample values produced as each element is scanned and sampled;

said polarity indicator configuring the apparatus to alternately determine opposite polarity peak values until the sequence of sample values representative of each element has been processed and said highest positive and lowest negative peak sample values for each element scanned has been determined.

* * * * *